United States Patent
Abadi et al.

(10) Patent No.: US 10,713,364 B2
(45) Date of Patent: Jul. 14, 2020

(54) SYSTEM AND METHOD FOR IDENTIFYING VULNERABILITIES IN CODE DUE TO OPEN SOURCE USAGE

(71) Applicant: WHITESOURCE LTD., Bnei-Brak (IL)

(72) Inventors: Aharon Abadi, Bnei-Brak (IL); Doron Cohen, Bnei-Brak (IL); David Habusha, Bnei-Brak (IL); Ron Rymon, Bnei-Brak (IL); Rami Sass, Bnei-Brak (IL)

(73) Assignee: WHITESOURCE LTD. (IL)

( * ) Notice: Subject to any disclaimer, the term of this patent is extended or adjusted under 35 U.S.C. 154(b) by 262 days.

(21) Appl. No.: 15/973,702

(22) Filed: May 8, 2018

(65) Prior Publication Data

US 2019/0347422 A1 Nov. 14, 2019

(51) Int. Cl.
*G06F 21/57* (2013.01)
*G06F 11/36* (2006.01)
*G06F 8/41* (2018.01)
*G06F 16/901* (2019.01)

(52) U.S. Cl.
CPC ............ *G06F 21/577* (2013.01); *G06F 8/433* (2013.01); *G06F 11/3616* (2013.01); *G06F 16/9024* (2019.01); *G06F 2221/033* (2013.01)

(58) Field of Classification Search
CPC ............................ G06F 21/577; G06F 16/9024
See application file for complete search history.

(56) References Cited

U.S. PATENT DOCUMENTS

| | | | | |
|---|---|---|---|---|
| 9,436,463 B2* | 9/2016 | Sass | .................. | G06F 8/751 |
| 9,871,815 B2* | 1/2018 | Ouchn | .............. | H04L 63/1433 |
| 10,116,683 B2* | 10/2018 | Czarny | .............. | H05K 999/99 |
| 2005/0010821 A1* | 1/2005 | Cooper | .............. | H04L 63/102 |
| | | | | 726/4 |
| 2007/0192867 A1* | 8/2007 | Miliefsky | .............. | H04L 63/20 |
| | | | | 726/25 |
| 2008/0257383 A1* | 10/2008 | Levinson | .......... | H01L 21/67028 |
| | | | | 134/6 |
| 2012/0136727 A1* | 5/2012 | Guioguio, Jr. | .......... | H04L 67/26 |
| | | | | 705/14.69 |

(Continued)

*Primary Examiner* — Ali Shayanfar
(74) *Attorney, Agent, or Firm* — The Roy Gross Law, LLC; Roy Gross (57) ABSTRACT

A method, computerized apparatus and computer program product, the method comprising: obtaining computer code; determining from the computer code a collection of components reachable from the computer code; providing information about the components to a server; identifying by the server using information retrieved from a database, reachable components associated with the collection of components, which have stored vulnerabilities; determining from the computer code and the reachable components that have stored vulnerabilities, a collection of reachable finer resolution components; identifying, further components from the collection of reachable finer resolution components, which have stored vulnerabilities; and outputting information about the further components, wherein the computer code cannot be reconstructed from the information about the collection of components and the information about the finer resolution components.

19 Claims, 5 Drawing Sheets

(56) References Cited

U.S. PATENT DOCUMENTS

| | | | |
|---|---|---|---|
| 2013/0312102 A1* | 11/2013 | Brake | G06F 21/577 |
| | | | 726/25 |
| 2014/0130151 A1* | 5/2014 | Krishnamurthy | G06F 8/65 |
| | | | 726/22 |
| 2014/0165031 A1* | 6/2014 | Balasubramanian | G06F 8/72 |
| | | | 717/120 |
| 2016/0182537 A1* | 6/2016 | Tatourian | H04L 63/1416 |
| | | | 726/23 |
| 2017/0083701 A1* | 3/2017 | Tajalli | G06F 16/245 |
| 2017/0147338 A1* | 5/2017 | Jackson | G06F 21/577 |
| 2017/0249143 A1* | 8/2017 | Sass | G06F 8/36 |
| 2017/0255544 A1* | 9/2017 | Plate | G06F 11/3636 |
| 2017/0308380 A1* | 10/2017 | Lee | G06F 11/3608 |

\* cited by examiner

SYSTEM AND METHOD FOR IDENTIFYING VULNERABILITIES IN CODE DUE TO OPEN SOURCE USAGE

TECHNICAL FIELD

The present disclosure relates to open source in general, and to a system and apparatus for identifying actual vulnerabilities in code due to open source usage, in particular.

BACKGROUND

Open source relates to computer source code that is publicly available and may be freely accessed and used by programmers in developing code. Open source may be provided as binary files or libraries to be linked with a user's' project, as code files to be compiled with a user's project, as code snippets to be added and optionally edited by a user as part of a file, in any other format, or in any combination thereof.

Open source may be used for a multiplicity of reasons, such as but not limited to: saving programming and debugging time and effort by obtaining a functional and verified unit; porting or programming code to an environment in which the user has insufficient experience or knowledge; adding generic options such as graphic support, printing, or the like, or other purposes. The ease of obtaining open source on the Internet has greatly increased the popularity of its usage.

Despite the many advantages, source code may also carry hazards. One such danger may relate to the need to trust code received from an external source. Such code may contain bugs, security hazards, time or space inefficiencies, viruses, Trojan horses, or any other vulnerability.

Another problem in using open source relates to the licenses which may be associated with any open source unit. Any such license may incur specific limitations or requirements on a user or a user's project developed using the open source.

For example, some licenses may require copyright and notification of the license. Others may require that if a user modified the used open source, for example fixed a bug, the user shares the modified version with other users in the same manner as the original source code was shared. Further licenses may require sharing the users' code developed with the open source with other users, wherein the user's code may comprise trade secrets and other confidential materials. The extent for which sharing is required may vary between files linked with files containing open source, and the whole user project. Further requirements may even have implications on the user's clients which may use the project developed with open source.

Open source may also pose legal limitations, such as limitations on filing patent applications associated with material from the open source, the inability to sue the open source developer or distributor if it does not meet expectations, or the like.

Once the requirements associated with using an open source are known, a user may decide whether it is acceptable for him or her to take the risks, comply with the requirements, and use the open source.

However, situations exist in which it is unknown whether and which open source is used by a program. Such situations may occur, for example, in large or complex projects with long calling chains, when a programming project is outsourced to an external entity, when a programmer left the company and did not update his colleagues, in large companies possibly employing program development teams at multiple sites, or the like.

BRIEF SUMMARY

One exemplary embodiment of the disclosed subject matter is a computer-implemented method comprising: obtaining computer code; determining from the computer code a collection of components reachable from the computer code; providing information about the components to a server; identifying by the server using information retrieved from a database, reachable components associated with the collection of components, which have stored vulnerabilities; determining from the computer code and the reachable components that have stored vulnerabilities, a collection of reachable finer resolution components; identifying, further components from the collection of reachable finer resolution components, which have stored vulnerabilities; and outputting information about the further components, wherein the computer code cannot be reconstructed from the information about the collection of components and the information about the finer resolution components. The method can further comprise providing information about the collection of reachable finer resolution components to the server, wherein identifying the further components from the collection of reachable finer resolution components which have stored vulnerabilities is performed by the server using further information retrieved from the database. The method can further comprise repeating: determining from the computer code and the further components from the finer resolution components which have known vulnerabilities, further finer resolution components reachable from the computer code; providing information about the further finer resolution components to the server; and identifying by the server using further information retrieved from the database, yet further components from the further finer resolution components, which have known vulnerabilities, until no information exists in the database for finer resolution components. Within the method, the finer resolution components optionally comprise at least one component selected from the group consisting of: a file, a class, a type, a package, a function and a method. Within the method, the finer resolution components optionally comprise lowest level open source components for which vulnerability information is stored. Within the method, the information about the collection of components optionally comprises a dependency graph of the computer code. Within the method, optionally the dependency graph is initially a library dependency graph. Within the method, the information about the finer resolution components optionally comprises a dependency graph in which each node represents an entity selected from the group consisting of: a file, a class, a type, a package, a function and a method. Within the method, determining the finer resolution components optionally comprises: backtracking from at least one of the components having known vulnerabilities to at least one root of the dependency graph to obtain at least one path; and determining a refined dependency graph along the at least one path, the at least one path containing elements of lower level than previously contained in the dependency graph. Within the method, the dependency graph is optionally generated using static analysis. Within the method, the dependency graph is optionally represented as a call flow graph, call graph, abstract syntax tree. Within the method, the database optionally stores known open source vulnerabilities.

Another exemplary embodiment of the disclosed subject matter is a computerized apparatus having a processor, the processor being adapted to perform the steps of: obtaining computer code; determining from the computer code a collection of components reachable from the computer code; providing information about the components to a server; identifying by the server using information retrieved from a database, reachable components associated with the collection of components, which have stored vulnerabilities; determining from the computer code and the reachable components that have stored vulnerabilities, a collection of reachable finer resolution components; identifying, further components from the collection of reachable finer resolution components, which have stored vulnerabilities; and outputting information about the further components, wherein the computer code cannot be reconstructed from the information about the collection of components and the information about the finer resolution components. Within the computerized apparatus, the finer resolution components optionally comprise one or more components selected from the group consisting of: a file, a class, a type, a package, a function and a method. Within the computerized apparatus, the finer resolution components optionally comprise lowest level open source components for which vulnerability information is stored. Within the computerized apparatus, the information about the collection of components optionally comprises a dependency graph of the computer code. Within the computerized apparatus, optionally the dependency graph is initially a library dependency graph. Within the computerized apparatus, the dependency graph is optionally generated using static analysis. Within the computerized apparatus, the database optionally stores known open source vulnerabilities.

Yet another exemplary embodiment of the disclosed subject matter is a computer program product comprising a computer readable storage medium retaining program instructions, which program instructions when read by a processor, cause the processor to perform a method comprising: obtaining computer code; determining from the computer code a collection of components reachable from the computer code; providing information about the components to a server; identifying by the server using information retrieved from a database, reachable components associated with the collection of components, which have stored vulnerabilities; determining from the computer code and the reachable components that have stored vulnerabilities, a collection of reachable finer resolution components; identifying, further components from the collection of reachable finer resolution components, which have stored vulnerabilities; and outputting information about the further components, wherein the computer code cannot be reconstructed from the information about the collection of components and the information about the finer resolution components.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is the need to identify reachable vulnerabilities within a user's code, also referred to herein as "code". A code may be compiled with, linked with, received in build time or in runtime, or otherwise include or one or more open source libraries, but may eventually not use any of their functionality. In other situations, the open source library may comprise files, functions or other portions that have vulnerabilities, and other portions that do not have vulnerabilities, wherein the code uses only the portions without vulnerability. In such situations, although the code is seemingly vulnerable due to the usage of open source, it is actually not subject to any of the vulnerabilities and is secure in that sense. Thus, it may be required to identify the smallest available open source portions that are reachable from the code and are known to contain vulnerabilities. These actual vulnerabilities of the code can then be considered or otherwise handled.

Another technical problem relates to determining the vulnerabilities of open source used in the code without transmitting, copying or otherwise providing the code to a location external to the user's network. Such providing may be against company secrecy policy, may comprise copyright infringement, or may expose the copied code to all kinds of security vulnerabilities, and is thus undesired. In addition, such copying may unnecessarily take up significant disk space and communication volume and time.

The term "vulnerability" as used herein is to be broadly construed as any problem or limitation associated with open source, including but not limited to any of the following: defect, licensee issue, requirement to expose the user's code, requirement to provide changed open source, redundant library or others.

The term "reachable" in the context of code as used herein is to be broadly construed as code that is called, linked, included or otherwise be accessed from user's code, whether directly or indirectly.

One technical solution comprises a method and system for determining the smallest portions of open source libraries that are reachable from the code and are known to be vulnerable. In some embodiments, a dependency graph of the user with the open source libraries is created and provided to a server or another computing platform having access to known vulnerabilities of open source libraries. A dependency graph may comprise a node for each component, and an edge connects two nodes if the source components calls, includes, or otherwise uses the target component. A dependency graph may be implemented as a call graph, call flow graph, abstract syntax tree, any oterh type or a combination thereof. The dependency graph may be created using static analysis of the code, or in any other manner.

The server can then determine which of the open source libraries that are reachable directly or indirectly from the code, e.g. are called or otherwise used by the code, or by other libraries used by the code comprise known vulnerabilities.

The reachable and vulnerable libraries can then be backtracked to the roots of their calling chains in the dependency graph, wherein the roots are in the user's code. The dependency graph can then be reduced to comprise only those paths leading from the roots associated with the user's code to the vulnerable and reachable libraries and exclude other paths of the graph. The reduced dependency graph can then be detailed to contain lower level components, such as files, types, packages, classes or other components derived for the used programming language, rather than libraries. The reduced and detailed graph thus comprises call chains of such components. The reduced and detailed graph can then be provided to the server, which determines the vulnerable components out of the reachable components of the lower level.

The process of backtracking the graph, reducing the graph to include only paths from the user's code to the vulnerable lower level components and detailing the paths to further lower level components, can then be repeated as long as vulnerability information exists for lower level components, such as functions or methods, or even lower level elements such as code lines or specific code instructions.

In some embodiments, at each iteration the server may receive the reduced dependency graph and may provide the elements from the dependency graph that are known to be vulnerable. In further embodiments, upon receiving the first dependency graph, for example the library dependency graph, the server may return also the lower level elements from the libraries which are known to be vulnerable, such as classes, types, packages, files, methods, functions or the like.

One technical effect of the disclosed subject matter thus relates to identifying the smallest open source components that are reachable from the code and are known to contain vulnerability. This may amount to much lesser, or even no vulnerability of the code, thus reducing problems or eliminating counter actions that need to be taken.

Another technical effect of the disclosed subject matter relates to determining the open source vulnerability without providing the user's code to an external entity, thus reducing risks of unauthorized usage of the code, copyright infringement or others. The information that is being provided to the server comprises usage information, such as one or more dependency graphs but not actual code, and thus does not enable reconstruction of the code.

Referring now to an example demonstrating the determination of the open source vulnerability in accordance with the disclosure.

The exemplary Java code listed below comprises a user class named UseLib and three open source libraries, Lib1, Lib2 and Lib3. Each of Lib1 and Lib2 comprises a vulnerable class, and Lib2 also comprises a safe class. The user code calls Lib3, Lib3 invokes the safe class of Lib2 and the vulnerable class of Lib1. Thus, the only vulnerability is that of the vulnerable class of Lib1.

```
package user.code;
public class UseLib {
        public static void main(String argv[ ]) {
                Entry entry = new Entry( );
                entry.lib3Entry( );
        }
}
Library 3
package lib3.entry;
public class Entry {
        public void lib3Entry( ) {
                Lib2SafeEntry lib2 = new Lib2SafeEntry( );
                Lib1Entry lib1 = new Lib1Entry( );
                lib2.SafeEntry( );
                lib1.vulnerabilityEntry( );
        }
}
Library 2
package lib2.entry;
public class Lib2SafeEntry {
        public void SafeEntry( ){
                Lib2Safe x = new Lib2Safe( );
                x.safe( );
        }
}
public class Lib2Vulnerability {
        public void vulnerability( ){
                //this is a vulnerability
                        System.out.print("Lib 2 vulnerability\n");
        }
}
public class Lib2Safe {
        public void safe( ){
                //this is a safe code
                        System.out.print("Lib 2 safe\n");
        }
}
Library 1
package lib1.entry;
public class Lib1Entry {
        public void vulnerabilityEntry( ){
                Lib1Vulnerability x = new Lib1Vulnerability( );
                x.vulnerability( );
        }
}
public class Lib1Vulnerability {
        public void vulnerability( ){
                //this is a vulnerability
                        System.out.print("Lib 1 vulnerability\n");
        }
}
```

It will be appreciated that the disclosure is not limited to the Java language, and is applicable to any programming language currently known or to programming languages that will be developed in the future.

Figure 1A:
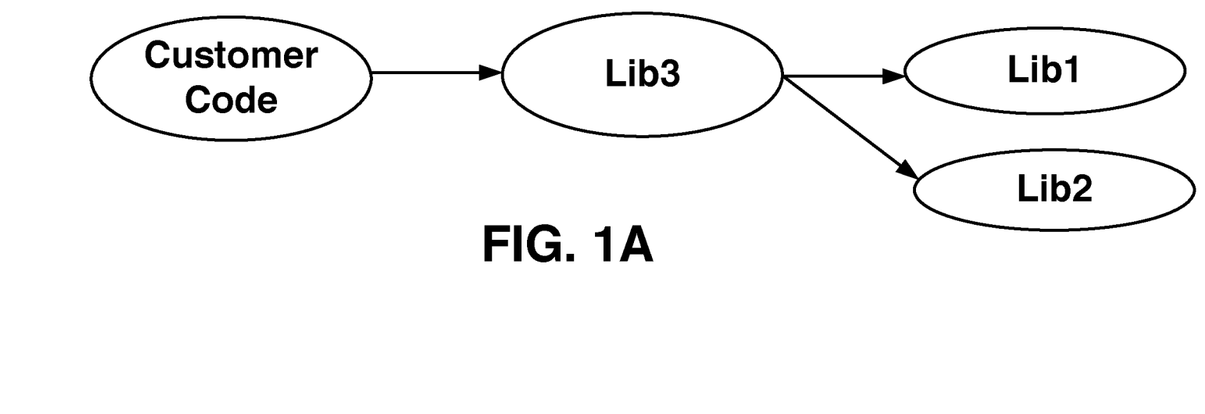
FIG. 1A shows a rough file dependency graph of exemplary code, in accordance with some exemplary embodiments of the subject matter.

Referring now to FIG. 1A, showing a rough library dependency graph of the exemplary code above, showing the library dependency. The graph is generated upon the program, for example by a plug-in installed within a development environment used by a developer for writing and testing code.

It will be appreciated that the exemplary library dependency graph does not contain Java libraries such as java.lang.Object, java.lang.String or others, although these libraries are referred to in the ocde above.

The library dependency graph, represented textually, graphically or in any other manner is provided to a server. The server, having access to vulnerability information of a multiplicity of libraries, including Lib1 and Lib 2 determines that reachable Lib1 and Lib2 contain vulnerabilities. The server may traverse the graph in any required order, such as Breadth First Search (BFS) or Depth First Search (DFS) to locate called libraries which are known to be vulnerable.

Figure 1B:
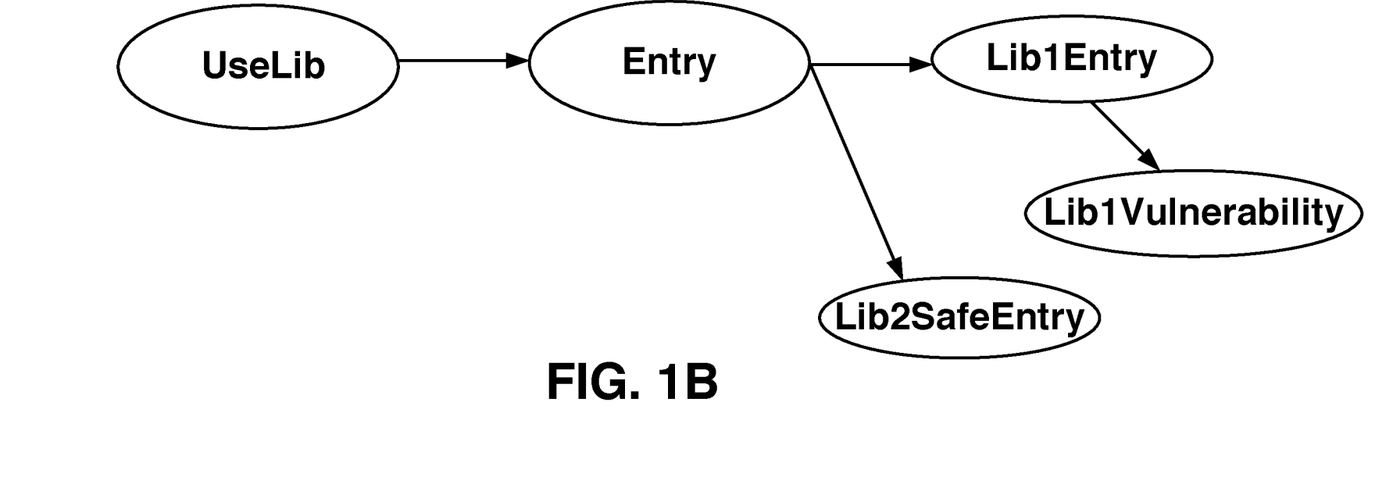
FIG. 1B shows a class dependency graph of the graph of FIG. 1A, in accordance with some exemplary embodiments of the subject matter.

This information is provided back to the plugin of the development environment. Lib1 and Lib2 are found in the rough dependency graph and a more detailed dependency graph is generated, as shown in FIG. 1B. The graph of FIG. 1B refers to classes rather than to libraries. In some embodiments, the graph may be provided to the server, which looks through available class vulnerability information, and determines that Lib2SafeEntry is safe, while Lib1Entry is vulnerable. In other embodiments, all vulnerability information related also to components of the libraries is provided to the plugin in response to the library dependency graph.

Lib1Entry is located within the dependency graph, and backtracked to Customer Code UseLib, while Lib2SafeEntry is not located since it was found to be safe, thus its path is ignored.

Figure 1C:
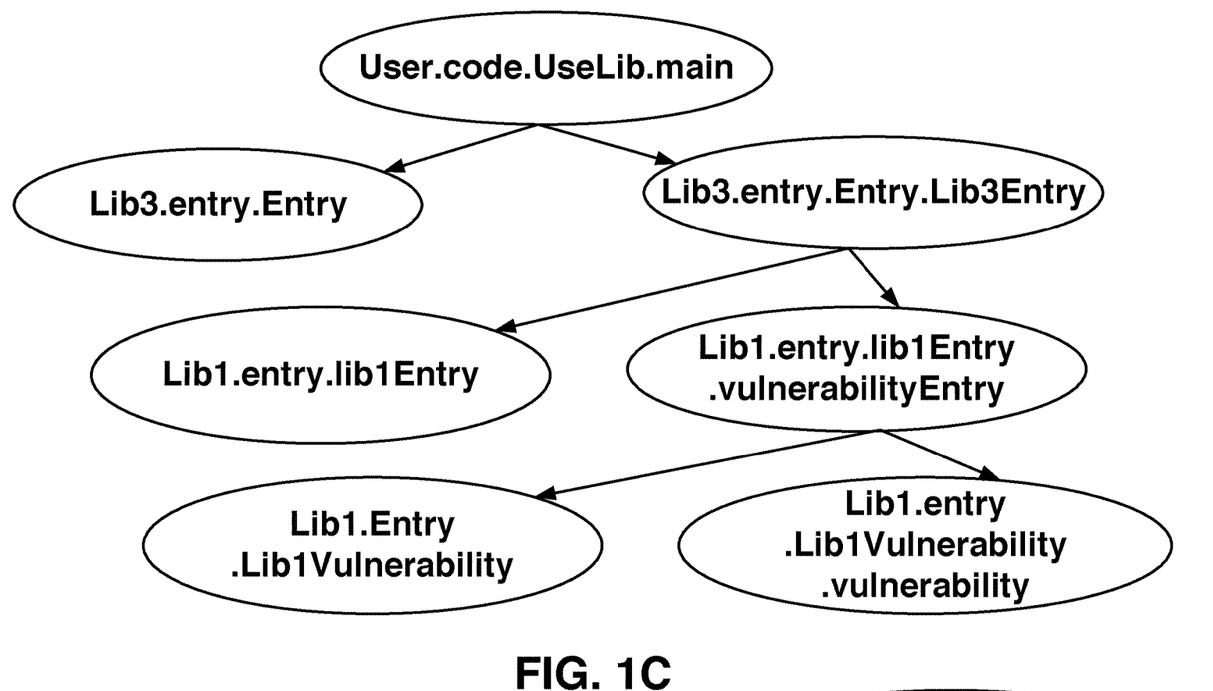
FIG. 1C shows a method dependency graph of the graph of FIG. 1B, in accordance with some exemplary embodiments of the subject matter.

The remaining parts of the graph are further detailed to include method calls, as shown in FIG. 1C. It will be appreciated that for simplicity, the parenthesis of the method calls are omitted, and that the entities containing the class names refer to the constructor of the respective classes. As described above, the detailed dependency graph may or may not be provided to the server, which may indicate that Lib1VulnerabilityEntry.Lib1Vulnerability (the constructor) and Lib1VulnerabilityEntry.Lib1Vulnerability.vulnerability are vulnerable. Lib1VulnerableEntry can be backtracked to Customer Code UseLib. No further vulnerability details are available to the server, thus the process stops.

Figure 1D:
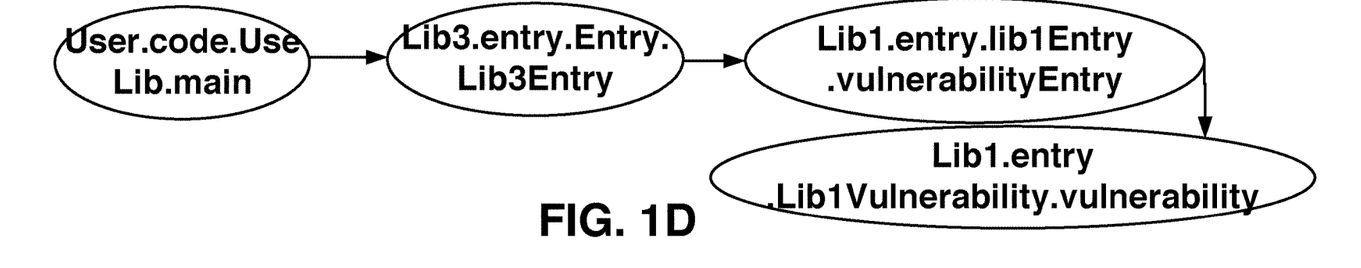
FIG. 1D shows a trace of the vulnerability of the exemplary code, in accordance with some exemplary embodiments of the subject matter.

FIG. 1D shows the trace information leading to a vulnerable method: UseLib 4→Lib3Entry→Lib1VulnerableEntry, indicating that this is a call path to vulnerable code. Each of the mentioned methods can be indicated with its full hierarchy:
user.code.UseLib.main→lib3.entry.
Entry.lib3Entry→lib1.entry.Lib1Entry.vulnerabilityE
ntry→lib1.entry.Lib1Vulnerability.vulnerability.

It will be appreciated that the trace can be class level, method level or the like. The output information may contain one or more partial traces, one trace, multiple traces, or all traces of the program.

Figure 2:
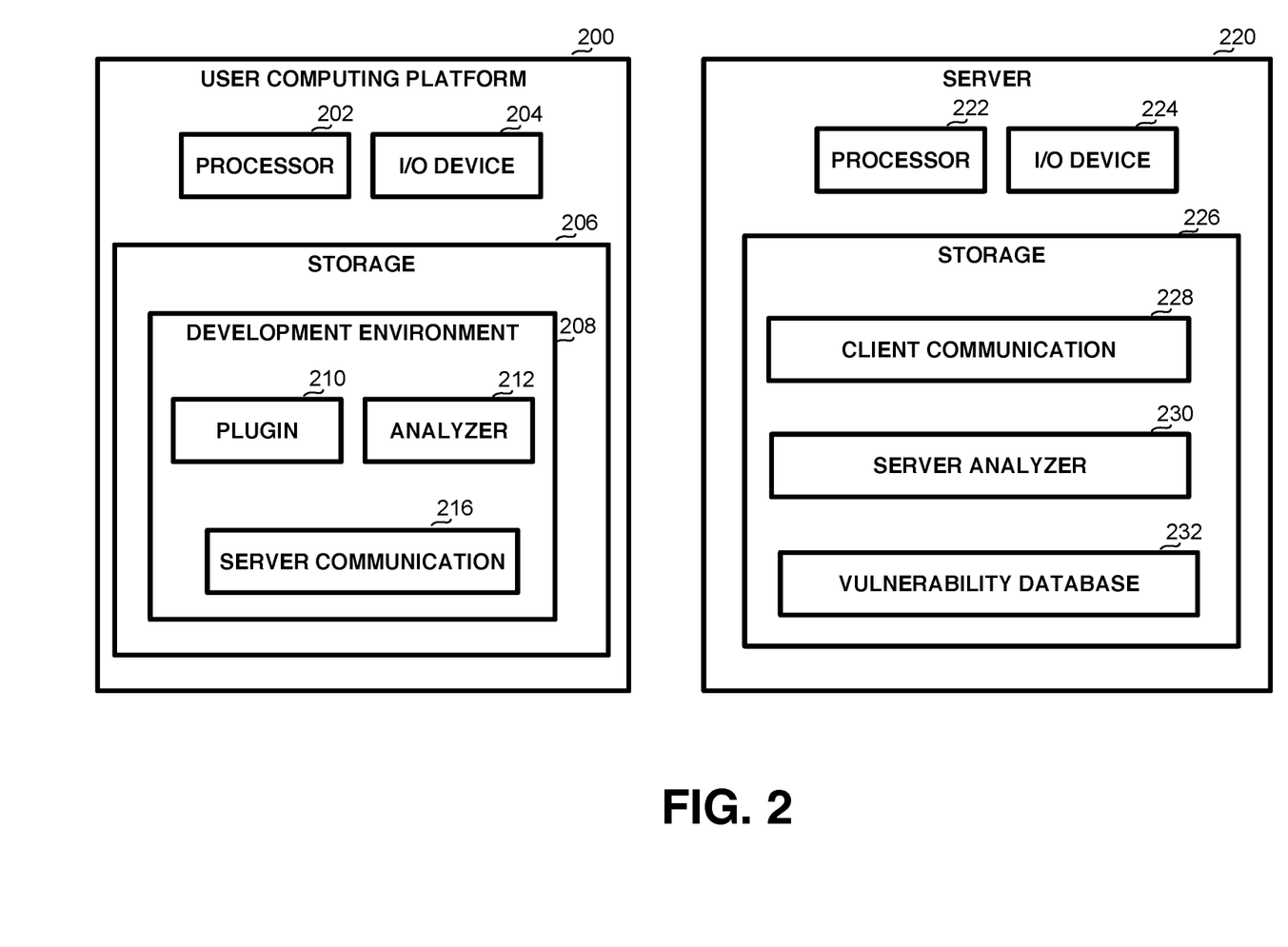
FIG. 2 shows a schematic illustration of a system for determining open source vulnerabilities, in accordance with some exemplary embodiments the disclosure.

Referring now to FIG. 2, showing a schematic illustration of a system for determining actual open source vulnerabilities, in accordance with some exemplary embodiments of the disclosure.

The system may comprise one or more user computing platforms 200.

Computing platform 200 can comprise processor 202. Processor 202 may be a Central Processing Unit (CPU), a microprocessor, an electronic circuit, an Integrated Circuit (IC) or the like. Processor 202 may be utilized to perform computations required by the apparatus or any of it subcomponents.

In some exemplary embodiments of the disclosed subject matter, computing platform 200 can comprise one or more Input/Output (I/O) devices 204 such as a display, a pointing device, a keyboard, a touch screen, or the like. I/O device 204 can be utilized to provide output to and receive input from a user.

Computing platform 200 may comprise or be operatively connected to one or more storage devices 206. Storage device 206 may be a hard disk drive, a Flash disk, a Random Access Memory (RAM), a memory chip, or the like. In some exemplary embodiments, storage device 206 can retain program code operative to cause processor 202 to perform acts associated with any of the subcomponents of computing platform 200.

Storage device 206 may comprise development environment 208, which a user may execute for developing programs.

Development environment 208 may comprise, in addition to all components used for developing programs, also plugin 210 for integrating the functionality of the disclosure, including determining actual vulnerabilities due to open source usage into the development environment, such that a user can be aware of the vulnerabilities also during development of the program, when it is still fairly easy to change.

Development environment 208 may comprise analyzer 212 for analyzing the code and construct its dependency graph, and use the vulnerability information received from the server detailed below.

Development environment 208 may comprise server communication module 216 for communicating with one or more servers, providing the dependency graph to a server and receiving the vulnerability information from a server. Communication can be, for example, over a network such at the Internet.

It will be appreciated that analyzer 212 and server communication module 216 can be implemented externally to development environment 208, for example as separate programs, libraries to be linked with, or the like.

The system can also comprise one or more servers 220, wherein each server 220 can serve a multiplicity of user computing platform 200, and each user computing platform 200 can receive services from one or more servers 220.

Server 220 can comprise processor 222, I/O module 224 and storage 226 similar to processor 202, I/O module 204 and storage 206 of user computing platform 200.

Storage 226 can comprise client communication module 228 for enabling communication with user computing platform 200, and specifically with server communication module 216. Server communication module 216 can receive dependency graphs, and report vulnerabilities to server communication 216.

Storage 226 can comprise server analyzer 230 for traversing the received dependency graphs, and locate components therein which are known to be vulnerable.

Storage 226 can comprise or be operatively connected to vulnerability database 232, for providing locating vulnerability information associated with one or more components, such as libraries, files, types, packages, classes, functions, methods or the like. Vulnerability database 232 can be updated as required manually, automatically or the like.

Figure 3:
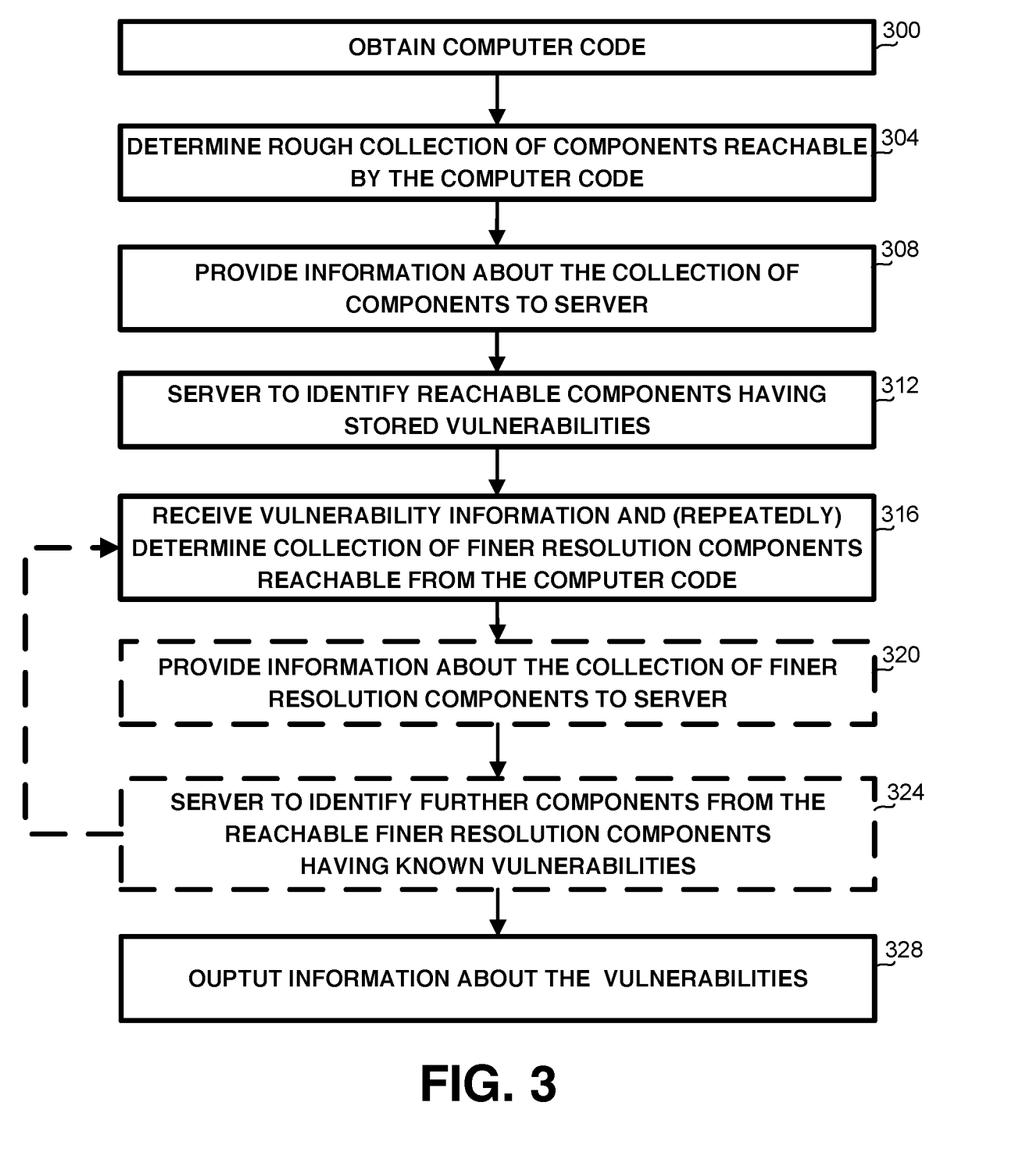
FIG. 3 shows a flowchart of steps in an embodiment of a method for determining actual vulnerabilities in code, in accordance with some exemplary embodiments the disclosure.

Referring now to FIG. 3, showing a flowchart of steps in a method for determining vulnerabilities in code.

On step 300 computer code may be obtained, for example by plugin 210 having access to code being developed in a development environment.

On step 304, a rough collection of components reachable from the computer code may be determined. The rough collection may take the form, for example, of a dependency graph in which each node is represented by a code element, such as a library, and each edge represents the source node of the edge calling the target node of the edge. The collection may be determined, for example, by analyzer 212.

On step 308, information about the collection of components, for example a description of the dependency graph may be provided to server 220. The information comprises the components that are reachable directly or indirectly from the user's code. For example, the information may be provided by server communication module 216 of user computing platform 200 to client communication module 228 of server 220. The information is insufficient for reconstructing the code itself. For example it may contain only the calling information. Thus, there is no hazard with exposing the information externally to the network of user computing platform 200.

On step 312, the server identifies out of the reachable components those components for which a vulnerabilities are stored in the database. The determination may be performed by server analyzer 220, which may query and receive response form vulnerability database 232. Vulnerability database 232 may be updated as new open source libraries or other components, and associated vulnerabilities become known. Server analyzer 220 may traverse a dependency graph received on step 308 in any manner such as BFS, DFS or the like in order to locate components for which known vulnerability exists On step 316 client computing platform 200, and in particular analyzer 212 receives the information about the vulnerable components, and determines a collection of reachable components, in which at least some components are of finer resolution than the elements previously determined. For example, if the dependency graph comprised libraries, the currently determined components may be files, types, packages, or classes. The determination is further detailed in association with FIG. 4 below.

On step 320, the information about the finer resolution elements is provided to the server similarly to step 308 above.

On step 324, the server identifies out of the reachable finer resolution components those for which vulnerability information exists, similar to step 312 above.

Step 316, 320 and 324 may repeat. For example, if the vulnerability information relates to files, types, packages or classes, further finer components may be functions or methods, or even source lines. The process may repeat until no further vulnerability information is available.

Alternatively, if detailed vulnerability information is received from the server on step 316, including also information related to vulnerability of classes, files, types, packages, methods or functions, then steps 320 and 324 can be omitted, and step 316 can be performed repeatedly until vulnerability is determined for the lowest level elements.

On step 328 information about the vulnerabilities may be provided, comprising for example the calling path leading from the user's code to the vulnerable component, wherein a hierarchy may be presented for each called component, for example in the form of library→file→function, library→class→method, or the like. The information may be provided as a list, a table, a graph, or in any other manner. The information may be provided to a file, stored in a database, displayed to a user on a display device, sent to a user, or the like. In some embodiments, the information may be displayed by plugin 210 as part of the development process using development environment 208.

Figure 4:
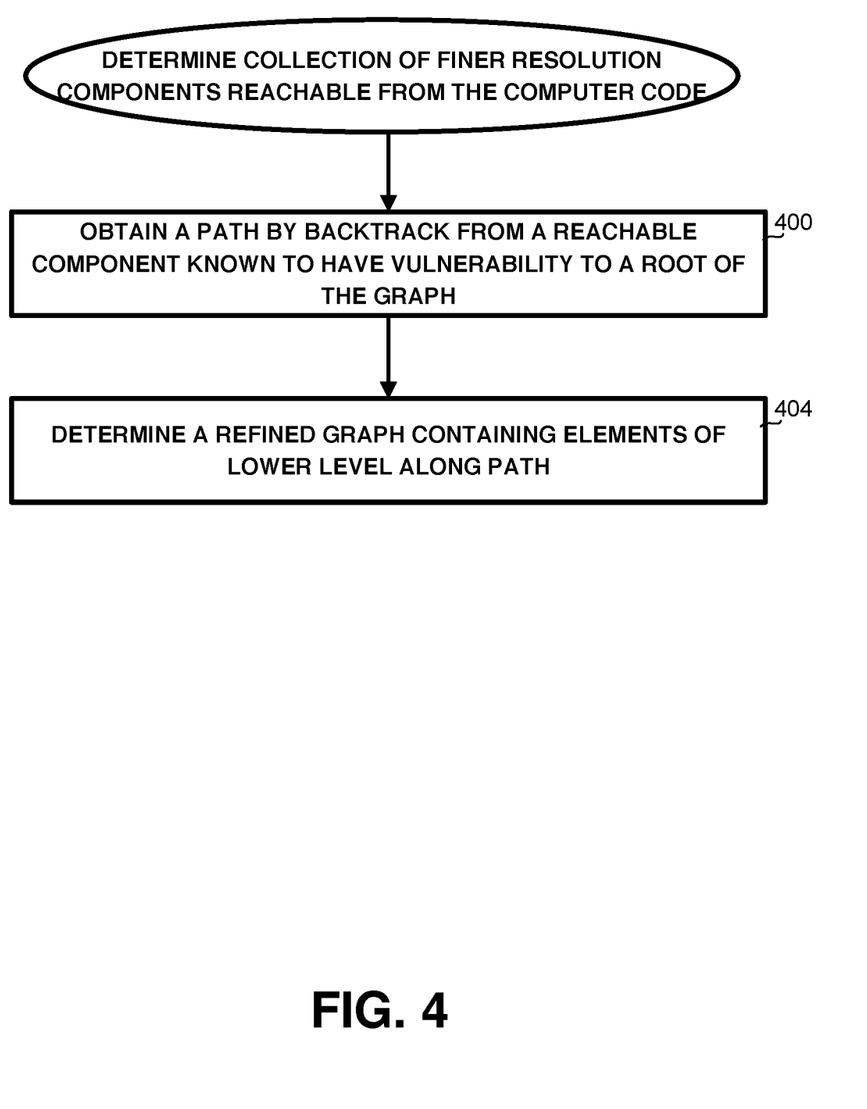
FIG. 4 shows a flowchart of steps in a method for determining a collection of finer resolution elements reachable from the computer code.

Referring now to FIG. 4, showing a flowchart of steps in a method for determining a collection of finer resolution elements reachable from the computer code.

On step 400, a previously provided collection of components, arranged for example as a dependency graph, is available, as well as vulnerability information for one or more components of the collection. Analyzer 212 can backtrack from each of the vulnerable components to a root of the dependency graph, thus obtaining paths leading from the user code to vulnerable components.

On step 404, a new or updated graph may be determined which comprises the one or more calling paths in the previous leading to vulnerable components. It will be appreciated that paths in the dependency graph leading to components with no vulnerability can be omitted from the new or enhanced graph. A refinement of the graph elements may then be obtained, for example to files, types or classes instead of libraries, functions or methods instead of files, types or classes, or the like. It will be appreciated that one or more components in the previous graph may be split into multiple components, as instead of calling a single library, multiple calls exist to multiple files in the library, each creating a new path. The refined graph may thus differ from a previous graph in that it does not contain certain paths from the previous graph, while other paths are split, thus creating further new paths.

The disclosed method and apparatus thus provide for fine resolution of vulnerability in an efficient manner, since it is not attempted to obtain fine resolution information for paths that include only components which are not known to be vulnerable. Rather at each stage further refinement is performed only for those paths that do contain vulnerabilities, thus providing for locating those vulnerabilities that can actually be reached from the user's code.

It is noted that the teachings of the presently disclosed subject matter are not bound by the computing platforms described with reference to FIG. 2 and the method of FIG. 3. Equivalent and/or modified functionality can be consolidated or divided in another manner and can be implemented in any appropriate combination of software with firmware and/or hardware and executed on one or more suitable devices. The steps of FIG. 3 or FIG. 4 can also be divided or consolidated in a different manner.

The system can be a standalone entity, or integrated, fully or partly, with other entities, which can be directly connected thereto or via a network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, JavaScript, NodeJs, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   obtaining computer code;
   determining from the computer code a collection of components reachable from the computer code;
   providing information about the components to a server;
   identifying using information retrieved from a database accessible to the server, reachable components associated with the collection of components, wherein each of the reachable components has at least one stored vulnerability;
   repeating:
      determining from the computer code and components identified as having at least one stored vulnerability, a collection of reachable finer resolution components; and
      identifying from the collection of reachable finer resolution components, reachable finer resolution components which have at least one stored vulnerability, using information retrieved from the database, until no information exists in the database for further finer resolution reachable components; and
   outputting information about the reachable components which have at least one stored vulnerability, and reachable finer resolution components which have at least one stored vulnerability,
   wherein the computer code cannot be reconstructed from the information about the collection of components and information provided to the server about the collection of reachable finer resolution components.

2. The method of claim 1, wherein identifying the reachable finer resolution components which have at least one stored vulnerability from the collection of reachable finer resolution components is performed by the server.

3. The method of claim 1, wherein the collection of reachable finer resolution components comprises at least one component selected from the group consisting of: a file, a class, a type, a package, a function and a method.

4. The method of claim 1, wherein the collection of reachable finer resolution components comprise lowest level open source components for which vulnerability information is stored.

5. The method of claim 1, wherein the information about the collection of components comprises a dependency graph of the computer code.

6. The method of claim 5 wherein the dependency graph is initially a library dependency graph.

7. The method of claim 6 wherein the information about a representation of the collection of reachable finer resolution components comprises a dependency graph in which each node represents an entity selected from the group consisting of: a file, a class, a type, a package, a function and a method.

8. The method of claim 5, wherein determining the finer resolution components comprises:
    backtracking from at least one of the components having at least one stored vulnerability to at least one root of the dependency graph to obtain at least one path; and
    determining a refined dependency graph along the at least one path, the at least one path containing elements of lower level than previously contained in the dependency graph.

9. The method of claim 5 wherein the dependency graph is generated using static analysis.

10. The method of claim 5 wherein the dependency graph is represented as a call flow graph, call graph, abstract syntax tree.

11. The method of claim 1, wherein the database stores known open source vulnerabilities.

12. A computerized apparatus having a processor, the processor being configured to perform the steps of:
    obtaining computer code;
    determining from the computer code a collection of components reachable from the computer code;
    providing information about the components to a server computer;
    the server computer retrieving information by accessing a database;
    identifying using the information, reachable components associated with the collection of components, wherein each of the reachable components has at least on stored vulnerability;
    repeating:
        determining from the computer code and components identified as having at least one stored vulnerability, a collection of reachable finer resolution components; and
            identifying from the collection of reachable finer resolution components, reachable finer resolution components which have at least one stored vulnerability using information retrieved from the database,
        until
            no information exists in the database for further finer resolution reachable components; and
    outputting information about the reachable components which have at least one stored vulnerability, and reachable finer resolution components which have at least one stored vulnerability,
    wherein the computer code cannot be reconstructed from the information about the collection of components and information provided to the server about the collection of reachable finer resolution components.

13. The computerized apparatus of claim 12, wherein the collection of reachable finer resolution components comprise at least one component selected from the group consisting of: a file, a class, a type, a package, a function and a method.

14. The computerized apparatus of claim 12, wherein the collection of reachable finer resolution components comprise lowest level open source components for which vulnerability information is stored.

15. The computerized apparatus of claim 12, wherein the information about the collection of components comprises a dependency graph of the computer code.

16. The computerized apparatus of claim 15 wherein the dependency graph is initially a library dependency graph.

17. The computerized apparatus of claim 12 wherein the dependency graph is generated using static analysis.

18. The computerized apparatus of claim 12, wherein the database stores known open source vulnerabilities.

19. A computer program product comprising a non-transitory computer readable storage medium retaining program instructions, which program instructions when read by a processor, cause the processor to perform a method comprising:
    obtaining computer code;
    determining from the computer code a collection of components reachable from the computer code;
    providing information about the components to a server;
    identifying using information retrieved from a database accessible to the server, reachable components associated with the collection of components, wherein each of the reachable components has at least one stored vulnerability;
    repeating:
        determining from the computer code and components identified as having at least one stored vulnerability, a collection of reachable finer resolution components; and
        identifying from the collection of reachable finer resolution components, reachable finer resolution components which have at least one stored vulnerability, using information retrieved from the database,
    until
    no information exists in the database for further finer resolution reachable components; and
    outputting information about the reachable components which have at least one stored vulnerability, and reachable finer resolution components which have at least one stored vulnerability,
    wherein the computer code cannot be reconstructed from the information about the collection of components and information provided to the server about the collection of reachable finer resolution components.

* * * * *

UNITED STATES PATENT AND TRADEMARK OFFICE
CERTIFICATE OF CORRECTION

PATENT NO. : 10,713,364 B2
APPLICATION NO. : 15/973702
DATED : July 14, 2020
INVENTOR(S) : Aharon Abadi et al.

It is certified that error appears in the above-identified patent and that said Letters Patent is hereby corrected as shown below:

On the Title Page

In item (72), Add the Following Inventors information:
Alex Maybaum Bnei-Brak IL Signed and Sealed this
First Day of August, 2023

Katherine Kelly Vidal
*Director of the United States Patent and Trademark Office*